United States Patent
Burstein

(10) Patent No.: US 7,075,261 B2
(45) Date of Patent: Jul. 11, 2006

(54) METHOD AND APPARATUS FOR CONTROLLING A FAN

(75) Inventor: Steven Burstein, Smithtown, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 10/119,983

(22) Filed: Apr. 10, 2002

(65) Prior Publication Data

US 2003/0193307 A1   Oct. 16, 2003

(51) Int. Cl.
G05B 5/00   (2006.01)
G05D 23/00   (2006.01)

(52) U.S. Cl. ............... 318/473; 318/471; 318/472; 318/138; 318/254; 318/439; 388/800; 388/804; 388/811; 388/911

(58) Field of Classification Search ........ 318/471–473, 318/443, 444, 138, 254, 439, 700–800; 388/804–911
See application file for complete search history.

(56) References Cited

U.S. PATENT DOCUMENTS

| | | | | |
|---|---|---|---|---|
| 4,382,218 A | * | 5/1983 | McVey | 318/812 |
| 4,459,519 A | * | 7/1984 | Erdman | 318/254 |
| 4,667,480 A | * | 5/1987 | Bessler | 62/180 |
| 4,722,669 A | | 2/1988 | Kundert | |
| 4,727,468 A | | 2/1988 | Maekawa | |
| 4,856,078 A | * | 8/1989 | Konopka | 388/831 |
| 5,249,741 A | | 10/1993 | Bistline et al. | |
| 5,307,439 A | | 4/1994 | Enami | |
| 5,563,480 A | * | 10/1996 | Okada | 318/254 |
| 5,687,079 A | | 11/1997 | Bauer et al. | |
| 5,727,928 A | * | 3/1998 | Brown | 417/44.11 |
| 5,825,972 A | | 10/1998 | Brown | |
| 5,942,866 A | * | 8/1999 | Hsieh | 318/268 |
| 5,962,933 A | | 10/1999 | Henderson et al. | |
| 5,990,582 A | | 11/1999 | Henderson et al. | |
| 6,182,902 B1 | | 2/2001 | Shih | |
| 6,188,189 B1 | | 2/2001 | Blake | |
| 6,194,858 B1 | * | 2/2001 | Chen | 318/473 |

(Continued)

OTHER PUBLICATIONS

Marando et al., U.S. Appl. No. 10/459,169 entitled "Programmable PWM Stretching for Tachometer Measurement", filed on Jun. 11, 2003.

(Continued)

*Primary Examiner*—Rina Duda
*Assistant Examiner*—Tyrone Smith
(74) *Attorney, Agent, or Firm*—Meyertons Hood Kivlin Kowert & Goetzel, P.C.; Jeffrey C. Hood; Erik A. Heter

(57) ABSTRACT

A method and apparatus for controlling a fan is disclosed. In one embodiment, a method for controlling a fan includes applying power to the fan at startup. The fan may be supplied a predetermined amount of current, which may break the inertia of the fan propeller and begin its rotation. As the propeller begins rotating, the speed at which it rotates may be monitored. The fan startup routine may continue until the fan reaches or exceeds a minimum fan speed threshold. Once the fan has at least reached the minimum speed, the amount of current supplied to the fan may be reduced such that the fan rotates at minimum speed, and an automatic fan control algorithm may begin executing. By reducing the current such that the fan operates at a minimum speed, the amount of audible noise generated by the fan during startup may be kept to a minimum level.

22 Claims, 4 Drawing Sheets

U.S. PATENT DOCUMENTS

| | | | |
|---|---|---|---|
| 6,204,623 B1 * | 3/2001 | Levy et al. | 318/641 |
| 6,208,538 B1 | 3/2001 | Halamik et al. | |
| 6,211,635 B1 * | 4/2001 | Kambe et al. | 318/254 |
| 6,226,324 B1 | 5/2001 | Allstrom | |
| 6,247,898 B1 | 6/2001 | Henderson et al. | |
| 6,262,549 B1 * | 7/2001 | Yang et al. | 318/463 |
| 6,380,704 B1 * | 4/2002 | Chin | 318/268 |
| 6,381,406 B1 * | 4/2002 | Smith et al. | 388/911 |
| 6,385,395 B1 * | 5/2002 | Horng et al. | 388/809 |
| 6,447,146 B1 | 9/2002 | Skinner et al. | |
| 6,448,896 B1 * | 9/2002 | Bankus et al. | 340/607 |
| 6,481,974 B1 * | 11/2002 | Horng et al. | 417/42 |
| 6,519,167 B1 | 2/2003 | Nguyen | |
| 6,528,987 B1 | 3/2003 | Blake et al. | |
| 6,563,284 B1 | 5/2003 | Teutsch et al. | |
| 6,601,168 B1 | 7/2003 | Stancil et al. | |
| 6,646,396 B1 * | 11/2003 | Brown et al. | 318/268 |
| 6,650,074 B1 | 11/2003 | Vyssotski et al. | |
| 6,661,679 B1 | 12/2003 | Yang et al. | |
| 6,703,803 B1 * | 3/2004 | Ohiwa et al. | 318/138 |
| 6,737,860 B1 * | 5/2004 | Hsu et al. | 324/161 |
| 6,885,160 B1 * | 4/2005 | Takeuchi | 318/139 |
| 2004/0001542 A1 | 1/2004 | Miller, Jr. | |

OTHER PUBLICATIONS

Analog Devices, Publication ADM1027, "*dB*COOL™ Remote Thermal Controller and Voltage Monitor," 2003, 56 pages.

National Semiconductor Corporation, Publication LM63, "±1° C Accurate Remote Diode Digital Temperature Sensor with Integrated Fan Control," Feb. 2003, 28 pages.

Stephen Ohr, "Analog IC vendors find 'Intel Inside' a safe bet," Sep. 12, 2002, online at http://www.eetimes.com/story/OEG20020912S0026.

\* cited by examiner

METHOD AND APPARATUS FOR CONTROLLING A FAN

BACKGROUND OF THE INVENTION

1. Field of the Invention

This invention relates to fan control, and more particularly, to controlling the startup routine for a fan.

2. Description of the Related Art

Fan control is an important aspect for cooling modern electronic systems, including computers. Fans are typically used in computers and other electronic systems to evacuate warm air from enclosures in which these systems are contained. This aids in eliminating waste heat which may otherwise build up and adversely affect system operation.

Control of fans in a system typically involves a fan control unit executing a fan control algorithm. A fan control algorithm may determine the method for controlling one or more fans which are configured to evacuate warm air from a system enclosure. The fan control algorithm may include increasing or decreasing the speed of the fan based on a detected temperature. Such control algorithms may also involve turning off a fan if the temperature is deemed cool enough to do so.

If a fan is turned off during the execution of a fan control algorithm, it may need to be restarted if the temperature within the enclosure rises. In order to start the fan, enough power must be applied to the fan to break the inertia of the propeller. Often times, fan control algorithms allow a maximum amount of current to be supplied to a fan in order force the fan blade to rotate at a speed sufficient for effective cooling. However, such a startup routine may cause an undesirable amount of audio noise, and may use an excess of electrical power as well.

SUMMARY OF THE INVENTION

A method and apparatus for controlling a fan is disclosed. In one embodiment, a method for controlling a fan includes applying power to the fan at startup. The fan may be supplied a predetermined amount of current, which may break the inertia of the fan propeller and begin its rotation. As the propeller begins rotating, the speed at which it rotates may be monitored. The fan startup routine may continue until the fan reaches or exceeds a minimum fan speed threshold. Once the fan has at least reached the minimum speed, the amount of current supplied to the fan may be reduced such that the fan rotates at minimum speed, and an automatic fan control algorithm may begin executing. By reducing the current such that the fan operates at a minimum speed, the amount of audible noise generated by the fan during startup may be kept to a minimum level.

In one embodiment, the fan control algorithm may be executed by a fan control unit. The fan control unit may include a temperature monitor, a speed controller, and a tachometer. The temperature monitor may be coupled to a temperature sensor, which may be located in a cooling zone. The fan control unit may turn on, turn off, or vary the speed of a fan in the temperature zone based on a temperature reading. The speed controller may turn the fan on or off, as well as controlling its speed when on. The tachometer may determine the speed at which the fan is running. The fan control unit may also include a timer and a status register. The timer may be configured to determine the amount of time elapsed from initial fan startup until the minimum fan speed is reached or exceeded. If the minimum fan speed is not reached or exceeded within a predetermined time limit, the timer may cause an interrupt status bit in the status register. Setting the interrupt status bit may cause certain actions within a computer system in which the fan control unit is implemented. In one embodiment, the computer system may automatically be shut down responsive the setting of the interrupt status bit.

BRIEF DESCRIPTION OF THE DRAWINGS

Other aspects of the invention will become apparent upon reading the following detailed description and upon reference to the accompanying drawings in which.

Figure 1A:
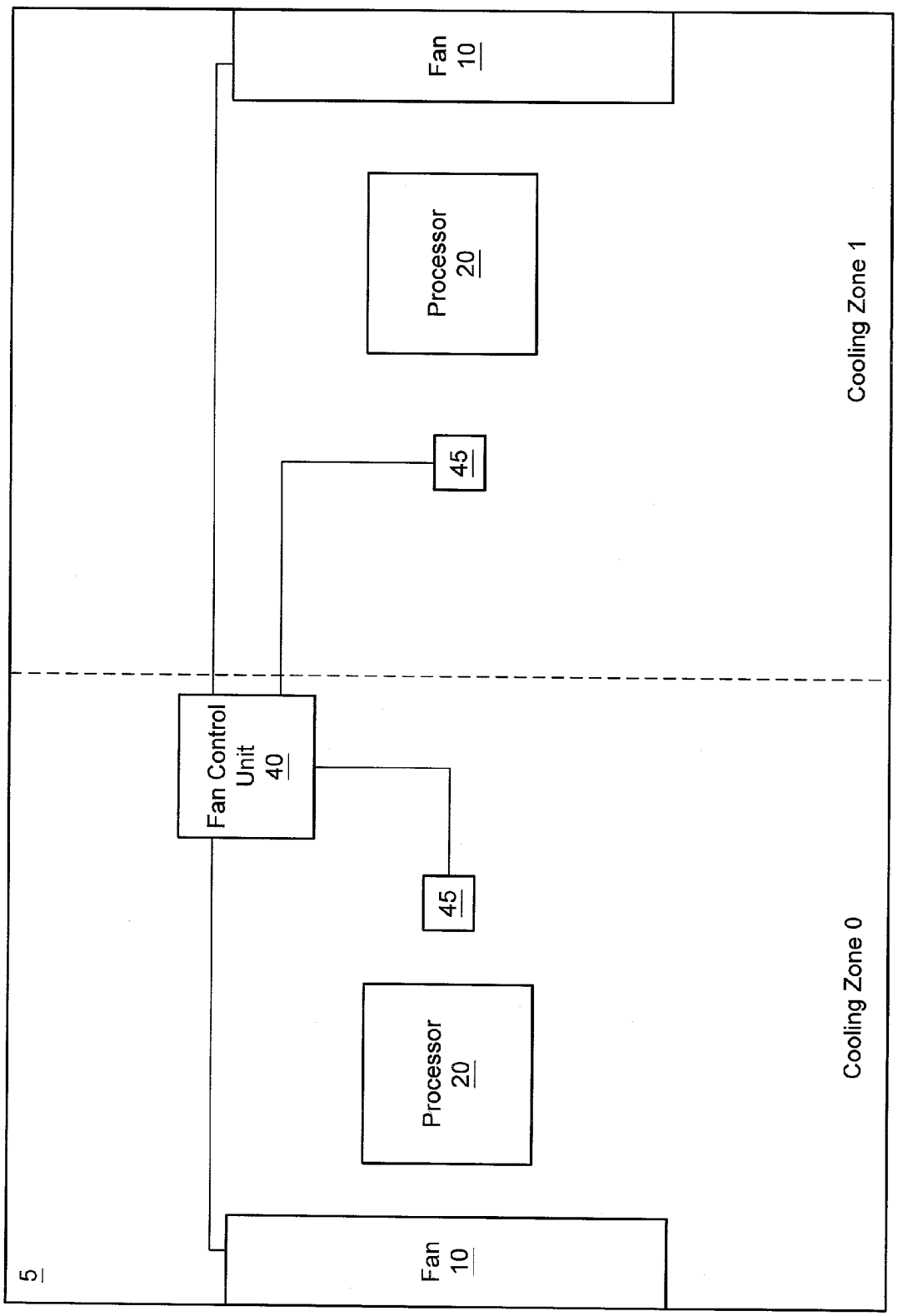
FIG. 1A is a block diagram of one embodiment of a computer system having multiple cooling zones, wherein the fans in the cooling zones may be controlled by a fan control unit.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Turning now to FIG. 1A, a block diagram of one embodiment of a computer system having multiple cooling zones is shown. Fans in each of the cooling zones may be controlled by a fan control unit. In the embodiment shown, computer system 5 includes two cooling zones, cooling zone 0 and cooling zone 1. Each cooling zone may include a fan 10, which may be used to evacuate warm air from an enclosure in which computer system 5 may be contained.

Each cooling zone includes a processor 20. Each processor 20 may generate a significant amount of heat during the operation of computer system 5. The heat generated by each processor 5 may warm the surrounding air in the cooling zone, which may in turn necessitate the operation of a fan 10 to prevent overheating. A temperature sensor 45 may be present in each cooling zone. The temperature sensor 45 may be coupled to a fan control unit 40. In the embodiment shown, computer system 5 includes a single fan control unit 40, although other embodiments having multiple fan control units are possible and contemplated. Fan control unit 40 may provide various fan control functions. These functions may include turning on a fan 10, adjusting the speed of a fan 10, or turning off a fan 10. Each fan 10 may be coupled to a power supply (not shown). Fan control unit 40 may provide one or more signals that switch power to each fan 10 on or off. The signals provided by fan control unit 40 may also determine the amount of current supplied to each fan 10, and thus their speed of operation.

Fan control unit 40 may power up one or more of fans 10 at system startup time. Fan control unit 40 may allow a predetermined amount of current to be supplied to the fan 10 during the startup. In one embodiment, fan control unit 40 may allow a fan 10 to draw a maximum amount of current in order to allow a propeller of the fan to break its inertia and begin rotating. As the fan propeller begins to rotate, fan control unit 40 may monitor the fan speed. At the point which the fan reaches or exceeds a minimum fan speed threshold, fan control unit 40 may cause the amount of current to supplied to the fan to be reduced such that the fan runs at a minimum speed. Fan control unit 40 may then enter an automatic fan control mode. Additional details of the fan startup and automatic control mode will be discussed in further detail below.

It should be noted that other embodiments of the computer system are possible and contemplated wherein only a single cooling zone is present, or wherein more than two cooling zones are present. Such systems may include a single processor or multiple processors, and may include multiple fans in each cooling zone, as well as including multiple fan control units.

Figure 1B:
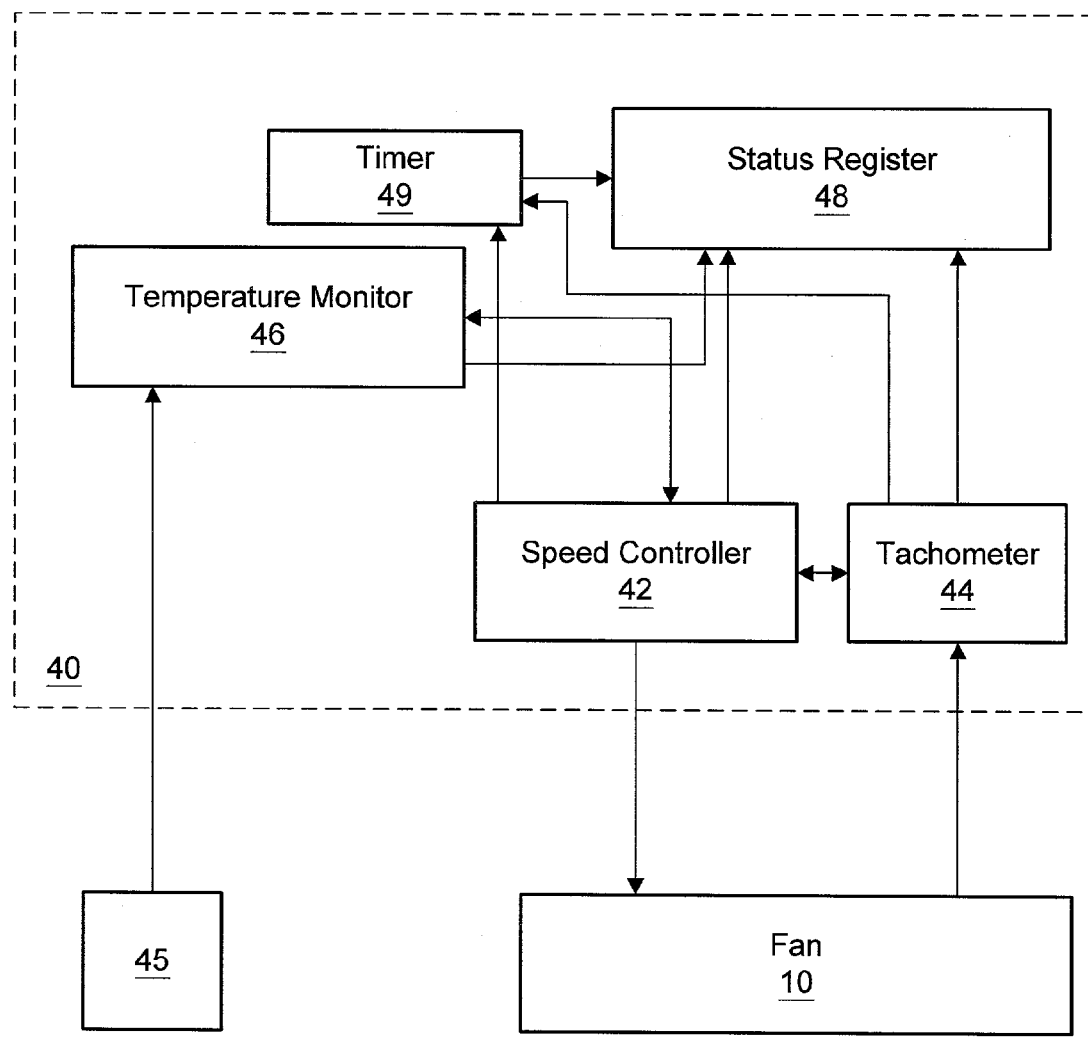
FIG. 1B is a block diagram of one embodiment of a fan control unit.

Moving now to FIG. 1B, a block diagram of one embodiment of fan control unit 40 is shown. Fan control unit 40 may include a temperature monitor 46, a speed controller 42, a tachometer 44, a status register 48, and a timer 49. A temperature sensor 45 and a fan 10 may be operatively coupled to fan control unit 40. The speed of fan 10 may be monitored by tachometer 44, while the speed at which fan 10 operates may be controlled by speed controller 42. Speed controller 42 may be configured to receive input signals from both tachometer 44 and temperature monitor 46, and may adjust the speed of fan 10 based on these inputs. In one embodiment, speed controller 42 may cause the speed of fan 10 to increase by increasing the amount of current fan 10 is allowed to draw from a power supply. Speed controller 42 may reduce the speed of fan 10 by reducing the amount of current it is allowed to draw from the power supply. In addition, speed controller 42 may be configured to switch fan 10 on or off.

During the startup of fan 10, tachometer 44 may monitor the fan speed. One or more signals indicating the fan speed may be received from tachometer 44 by speed controller 42. In one embodiment, tachometer 44 may be configured to measure the time interval for a blade of the fan to make one revolution. The measured time interval may be used to determine the speed of fan 10. Tachometer 44 may provide an indication of the speed of fan 10 to both status register 48 and speed controller 42. Once tachometer 44 determines that the time interval is less than or equal to a maximum time interval (thereby indicating that the minimum speed has been reached or exceeded), speed controller 42 may cause the current drawn to be reduced such that fan 10 rotates at its minimum speed. Fan control unit 40 may then enter an automatic fan control mode wherein the amount of current drawn by fan 10 may be increased or decreased according to temperature or other operating parameters. Tachometer 44 may continue monitoring the speed of fan 10 during subsequent to entering the automatic control mode.

Temperature monitor 46 may be coupled to temperature sensor 45. Temperature sensor 45 may sense the temperature for the cooling zone in which it is located. Temperature monitor may receive an indication of the temperature from temperature sensor 45. Temperature monitor 46 may instruct speed controller 42 to adjust the speed of the fan according to the temperature of the respective cooling zone. If temperature monitor 46 determines that the speed of fan 10 is insufficient to provide the necessary cooling of the temperature zone, it may instruct speed controller to increase the speed of fan 10. Similarly, if temperature monitor determines that the speed of fan 10 exceeds the necessary RPM (revolutions per minute) for the present temperature, it may instruct speed controller 42 to reduce the fan speed. If the temperature falls below a minimum temperature threshold, temperature monitor 46 may instruct speed controller 42 to turn the fan off. If the fan has been turned off, and temperature monitor 46 receives an indication that the temperature of the zone has reached or exceeded the minimum temperature threshold, it may instruct speed controller 42 to turn on fan 10 and enter the startup mode.

Status register 48 may be configured to store various information concerning the operation of fan 10 and fan control unit 40. Such information may include the present speed of the fan, the on/off state of the fan, and the temperature. Status register 48 may also be coupled to timer 49. Timer 49 may be configured to determine whether fan 10 has reached a minimum speed threshold within a predetermined time limit upon startup. If fan 10 fails to reach the minimum speed within the predetermined time limit, timer 49 may cause an interrupt status bit to be set in status register 48. A computer system in which fan control unit 40 is implemented may take various actions responsive to the interrupt status bit being set. In one embodiment, a computer system may generate an error message and/or cause a system shutdown responsive to the interrupt status bit being set.

Figure 2:
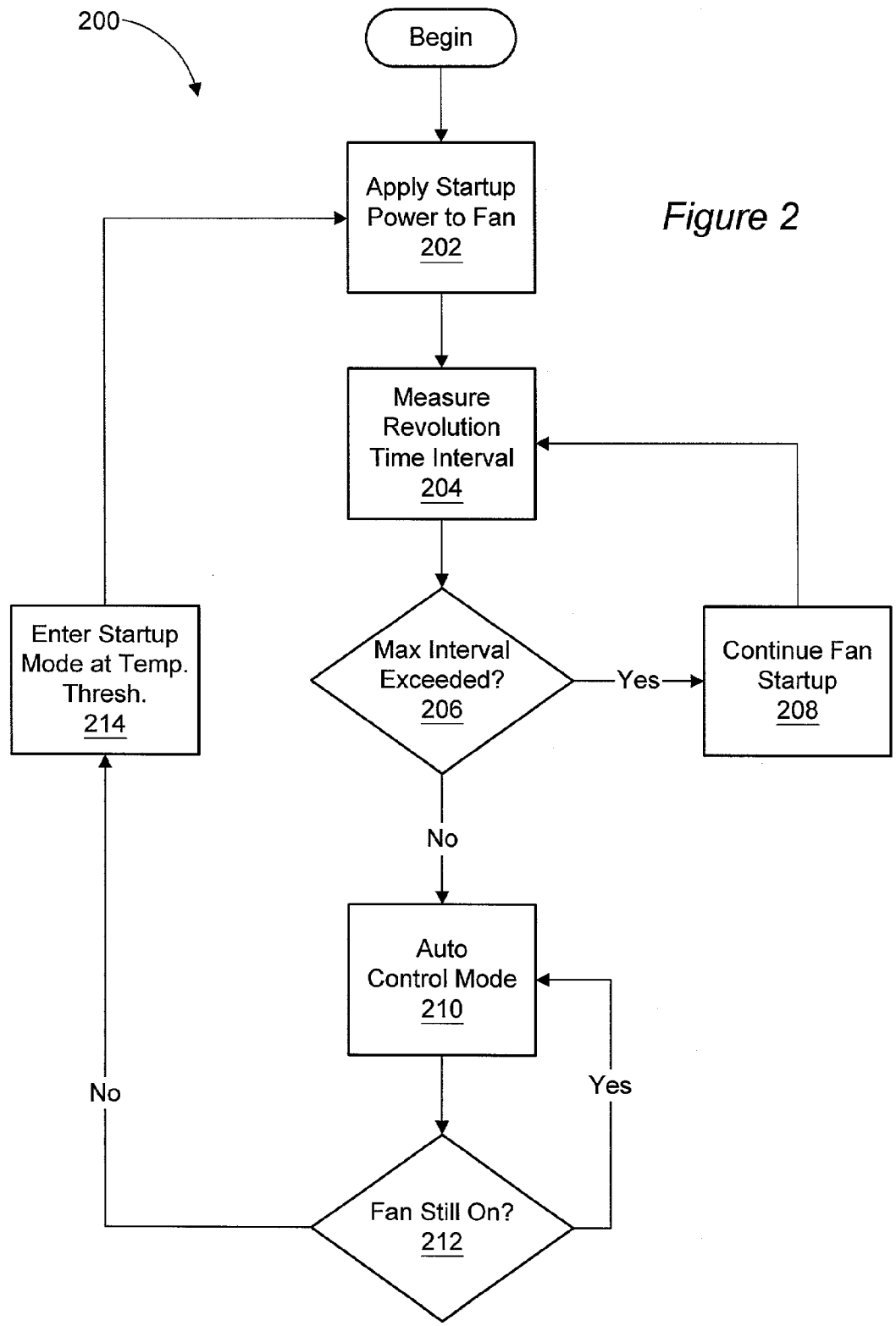
FIG. 2 is a flow diagram of one embodiment of a method for starting a fan.

Moving now to FIG. 2, a flow diagram of one embodiment of a method for starting a fan is shown. Method 200 begins with the fan in an off state. The fan may be in an off state due to the system being in a shut down state, or due to having been shut down during system operation. Startup power may be applied to the fan (202) during an initial system startup or a startup of the fan by a fan control unit during normal system operations. Applying startup power to the fan may include allowing the fan to draw a maximum amount of current consistent with its current rating. Allowing the fan to draw current at its maximum rating may allow the fan propeller to begin rotating, and may further allow it to reach an operational speed in a minimum amount of time.

As the propeller of the fan begins rotating, a tachometer may begin monitoring the fan speed (204). In one embodiment, the tachometer may determine the fan speed by measuring a time interval required for the fan to make one complete revolution. Other means of measuring the fan speed are possible and contemplated. Such means may include measuring the time elapsed for a fan blade to make a partial revolution, checking the number of fan blades passing a given point within a certain time interval, or monitoring the frequency at which fan blades pass a given point. As the fan speed increases, the measured time interval will become progressively shorter. With each measurement, the time interval may be compared with a maximum time interval (206), wherein the maximum time interval is indicative of a minimum fan speed threshold. If the measured time interval exceeds the maximum time interval, the fan startup routine may continue (208). Continuing the fan startup routing may include continuing to allow the fan to draw its maximum rated current.

During the comparison (206), it may be determined that the measured time interval no longer exceeds the maximum time interval. This may indicate that the minimum fan speed threshold has been reached or exceeded. The fan control unit may enter an automatic control mode (210) responsive to the fan reaching its minimum speed threshold. Entering the automatic control mode may include causing the amount of current drawn by the fan to be reduced to a level consistent with the minimum fan speed. This may reduce the amount of audible noise created by the fan.

During the automatic control mode it may be possible the temperature of a control zone falls below a minimum temperature threshold. This may cause the fan control unit to turn the fan off. A periodic check may be performed to determine whether the fan is on or off (212). If the fan is still on, and the temperature is greater than the minimum temperature threshold, the fan control unit may remain in the automatic control mode. If the fan is off, it may remain off until the temperature reaches a predetermined temperature threshold. Upon reaching or exceeding the predetermined temperature threshold, the fan control unit may reenter the startup mode (214).

Figure 3:
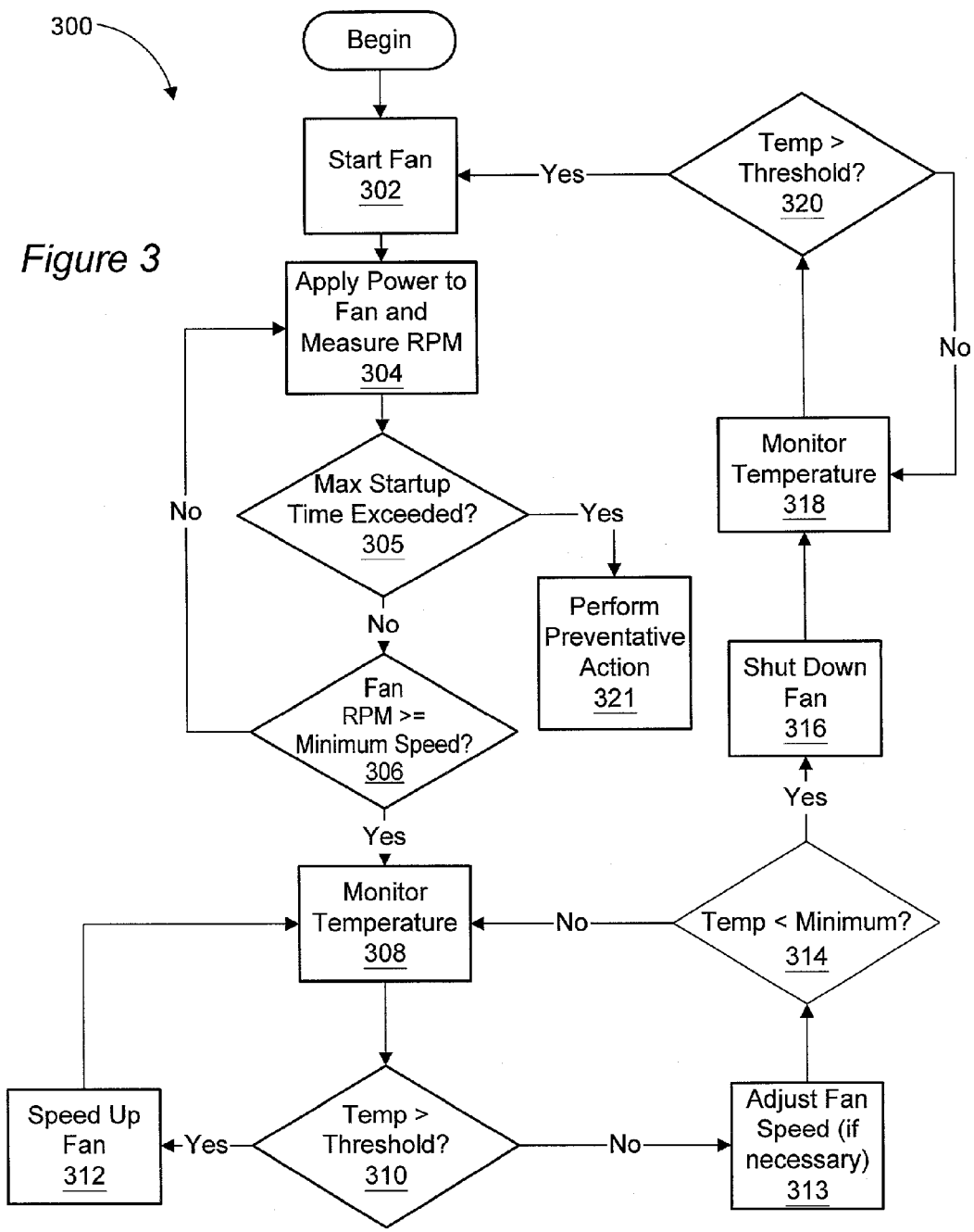
FIG. 3 is a flow diagram of one embodiment of a fan control algorithm.

Turning now to FIG. 3, a flow diagram of one embodiment of a fan control algorithm is shown. Fan control algorithm 300 may include elements of both a startup mode and an automatic control mode. Fan control algorithm 300 may begin with the startup of a fan (302). The speed of the fan may be measured as power is applied (304). The fan may be allowed to draw its maximum rated current at startup, which may allow it to achieve a minimum speed threshold in a relatively short time. The fan speed may be monitored by various methods. For example, the fan speed may be monitored by measuring a time interval for the fan propeller to make one complete revolution, as discussed above in reference to FIG. 2. Other means of measuring the fan speed are possible and contemplated. Such means may include measuring the time elapsed for a fan blade to make a partial revolution, checking the number of fan blades passing a given point within a certain time interval, or monitoring the frequency at which fan blades pass a given point.

The monitoring of the fan speed may continue until it is determined that the fan has reached a minimum speed threshold (306). During the startup of the fan, the amount of time elapsed to prior to reaching a minimum speed threshold may be compared to a maximum startup time (305). If the maximum startup time is exceeded, the system may cause preventative action to be taken (321). Such preventative action may include the shutting down of the system, generating an error message to a user, or both. In general, item 321 may include any action that may prevent the computer system (or cooling zone) from overheating.

If the fan speed does meet the minimum speed requirement within the startup time requirement, the amount of current that is allowed to be drawn by the fan may be reduced such that the fan runs at or near the minimum speed threshold. At this point, the fan control unit may enter the automatic control mode.

Entering the automatic control mode may include monitoring the temperature of a control zone (308). If the temperature exceeds a predetermined threshold (310), a fan control unit operating in the automatic control mode may cause the fan to speed up (312). The speeding up of the fan may cause warm air to be evacuated from a system enclosure at a faster rate. Temperature monitoring may continue (308), along with the comparison of temperature readings to a predetermined temperature threshold (310). If the temperature does not exceed a predetermined threshold, the fan speed may be adjusted, if necessary (312). For example, if the fan speed is greater than necessary for a given temperature, the fan speed may be reduced. However, if the fan speed is commensurate with the temperature of the control zone, it may be left unchanged.

Temperature comparisons may also be made between the measured temperature and a minimum temperature (314). If the temperature is greater than the minimum, the fan may continue running and the fan control unit may remain in the automatic control mode, monitoring the temperature and adjusting the fan speed as necessary. If the temperature falls below the minimum temperature, the fan control unit may shut down the fan (316). Although the fan may be in a shut down state, the fan control unit may continue temperature monitoring (318). Each temperature reading may be compared with the minimum temperature threshold (320). Should the measured temperature remain below the temperature threshold, the fan may remain in the shut down state. However, if the measured temperature reaches or exceeds the minimum temperature threshold, the fan control unit may enter the startup mode by restarting the fan (302).

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for controlling a fan, the method comprising:
    applying power to the fan, wherein in first applying power to the fan the fan is substantially at rest;
    performing a fan startup routine comprising monitoring a speed of the fan, and reducing current supplied to the fan responsive to the fan speed reaching or exceeding a minimum fan speed threshold, wherein in reducing the current supplied to the fan, the fan speed remains at a level commensurate with at least the minimum fan speed threshold; and
    entering an automatic fan control mode responsive to the fan speed remaining at the level commensurate with at least the minimum fan speed threshold.

2. The method as recited in claim 1, wherein said applying power includes supplying a maximum amount of current to the fan.

3. The method as recited in claim 1, wherein said monitoring the speed of the fan includes measuring a time interval for a blade of the fan to make one complete revolution.

4. The method as recited in claim 3, wherein the automatic fan control mode is entered responsive to the time interval no longer exceeding a maximum allowable limit.

5. The method as recited in claim 1 further including setting an interrupt status bit if said reaching or exceeding the minimum fan speed threshold exceeds a predetermined time limit.

6. The method as recited in claim 1, wherein said automatic fan control mode includes:
    monitoring a temperature;
    increasing the fan speed if the temperature exceeds a preset temperature threshold; and
    shutting down the fan if the temperature falls below a minimum temperature threshold, wherein said shutting down the fan includes exiting the automatic control mode.

7. The method as recited in claim 6 further comprising monitoring the temperature subsequent to said shutting down the fan.

8. The method as recited in claim 7 further comprising repeating said applying power to the fan responsive to the temperature exceeding the minimum temperature threshold.

9. The method as recited in claim 6 further comprising reducing the fan speed if the temperature falls below the preset temperature threshold but exceeds the minimum temperature threshold.

10. The method as recited in claim 1, wherein said controlling the fan is performed by a fan control unit.

11. The method as recited in claim 9, wherein the fan control unit is implemented on an integrated circuit.

12. A fan control unit comprising:
- a temperature monitor, wherein the temperature monitor is configured to monitor a temperature in a control zone;
- a tachometer, wherein the tachometer is configured to determine a speed of a fan; and
- a speed controller, wherein the speed controller is configured to:
  - operate in a fan startup mode upon a startup of the fan, wherein during the fan startup mode the speed controller is operable to allow a predetermined amount of current to be applied to the fan, and is further operable to reduce current applied to the fan responsive to the fan speed reaching or exceeding a minimum fan speed threshold, wherein in reducing the current applied to the fan the fan speed remains at a level commensurate with at least the minimum fan speed threshold; and
  - operate in an automatic fan control mode, wherein the speed controller is operable to begin operating in the automatic fan control mode responsive to the fan speed remaining at the level commensurate with at least the minimum fan speed threshold.

13. The fan control unit as recited in claim 12, wherein the predetermined amount of current is a maximum rated current amount.

14. The fan control unit as recited in claim 12, wherein the tachometer is operable to determine the speed of the fan by measuring a time interval for a blade of the fan to make one complete revolution.

15. The fan control unit as recited in claim 14, wherein the speed controller is further operable to begin operating in the automatic fan control mode responsive to the time interval no longer exceeding a maximum allowable limit.

16. The fan control unit as recited in claim 15, wherein, during the automatic fan control mode, the fan control unit is operable to: monitor the temperature;
- cause the speed of the fan to increase responsive to the temperature exceeding a predetermined temperature threshold; and
- shut down the fan if the temperature falls below a minimum temperature threshold, wherein shutting down the fan includes exiting the automatic control mode.

17. The fan control unit as recited in claim 16 wherein the fan control unit is further configured to monitor the temperature after the fan has been shut down.

18. The fan control unit as recited in claim 17, wherein the fan control unit is operable to restart the fan responsive to the temperature exceeding the minimum temperature threshold.

19. The fan control unit as recited in claim 16, wherein the fan control unit is operable to reduce the speed of the fan responsive to the temperature falling below the predetermined temperature threshold but exceeding the minimum temperature threshold.

20. The fan control unit as recited in claim 12, wherein the fan control unit includes a status register configured to store an interrupt status bit.

21. The fan control unit as recited in claim 20, wherein the interrupt status bit is set responsive to an amount of time to reach the minimum fan speed threshold exceeding a predetermined time limit.

22. The fan control unit as recited in claim 12, wherein the fan control unit is implemented in an integrated circuit.

* * * * *